United States Patent
Peck (10) Patent No.: US 6,630,924 B1
(45) Date of Patent: Oct. 7, 2003

(54) GESTURE SENSING SPLIT KEYBOARD AND APPROACH FOR CAPTURING KEYSTROKES

(75) Inventor: Charles C. Peck, Newtown, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/507,668

(22) Filed: Feb. 22, 2000

(51) Int. Cl.[7] ................................................. G09G 5/00
(52) U.S. Cl. ........................ 345/168; 345/169; 345/156
(58) Field of Search ................................. 345/168, 169, 345/158, 156, 173; 340/706, 679; 341/22; 400/472

(56) References Cited

U.S. PATENT DOCUMENTS

| | | | | |
|---|---|---|---|---|
| 5,122,786 A | * | 6/1992 | Rader .......................... 340/706 |
| 5,168,531 A | * | 12/1992 | Sigel ........................... 382/48 |
| 5,267,127 A | * | 11/1993 | Pollitt ......................... 361/680 |
| 5,396,222 A | * | 3/1995 | Markus et al. ............... 340/679 |
| 5,426,449 A | * | 6/1995 | Danziger .................... 345/168 |
| 5,736,976 A | * | 4/1998 | Cheung ....................... 345/168 |
| 5,864,334 A | * | 1/1999 | Sellers ........................ 345/168 |
| 5,936,555 A | * | 8/1999 | Zagnoev ...................... 341/22 |
| 6,022,156 A | * | 2/2000 | Blish ........................... 400/472 |
| 6,111,527 A | * | 8/2000 | Susel .......................... 345/168 |
| 6,121,960 A | * | 9/2000 | Carroll et al. ............... 345/173 |
| 6,237,846 B1 | * | 5/2001 | Lowell et al. ............... 235/145 |
| 6,297,752 B1 | * | 10/2001 | Ni ................................ 341/22 |

* cited by examiner

Primary Examiner—Steven Saras
Assistant Examiner—Alecia D. Nelson
(74) Attorney, Agent, or Firm—Whitham, Curtis & Christofferson, P.C.; Stephen C. Kaufman (57) ABSTRACT

A gesture sensing split keyboard can couple the hand and keyboard rotations, can sense hand rotation and one or more keystrokes of each hand, can produce symbolic, control, command, and other types of information based upon all the sensed inputs, and can present the produced information to a computing, communications, or control device through electrical conductors, infrared transceivers, or other communications technologies. The various embodiments can be mounted on the operator's hands, arms, or belt, on a desktop or other stable surface, or may be embedded in the target device, such as a laptop computer. The ability of certain embodiments to fold into a compact size for storage while providing ease-of-use of a full-sized keyboard when unfolded for typing makes them well suited for laptop computers. The ability of certain other embodiments to be mounted on the body of the user and to enable a wide range of user motion makes them well suited for mobile and pervasive computing applications and for potentially reducing repetitive stress injuries.

31 Claims, 11 Drawing Sheets

GESTURE SENSING SPLIT KEYBOARD AND APPROACH FOR CAPTURING KEYSTROKES

BACKGROUND OF THE INVENTION

1. Field of the Invention

The present invention generally relates to computer keyboards and, more particularly, to a split keyboard that is composed of two sets of keys and uses wrist position to multiply the interpretations of the two sets of keys.

2. Background Description

There are many drawbacks associated with the existing keyboard designs and methods for capturing keystrokes.

First, existing keyboard designs require unnatural, fixed hand positions leading to discomfort, muscle fatigue, and repetitive stress injuries (RSI). Specifically, traditional, flat keyboards require the user to rotate their wrist inwardly and to hover their hands above the keys. Furthermore, the hands must be brought from the user's sides to the center of their body and kept there. Making matters worse, there is little need to move the hands from these positions. These positions require constant muscle pressure without movement, which leads to muscle fatigue, discomfort and pain. The continuous finger movements with the hands in these stressed positions lead to repetitive stress syndrome problems.

Second, the hands must move relative to the keys, making touch typing difficult. Touch typing requires the use of memorized, easily repeatable, high precision gestures to indicate the desired character. Fine motor movements, such as finger gestures, are ideal for this purpose. Gross motor movements, such as arm movements, are very poor for this purpose. Traditional keyboards make the most commonly accessed characters reachable via fine motor movements. The less often used keys, such as numbers, punctuation marks, function keys, the "T" and "Y", the "Enter", "Shift", and "Backspace" keys, require a combination of fine and gross motor movements. Most people are, therefore, unable to use touch typing techniques for accessing these characters. When these keys are commonly accessed, such as the "Enter", "Shift", and "Backspace" keys, they are typically given a larger surface to make contact more likely and less error prone. Unfortunately, these strategies are not sufficient to enable continuous touch typing for most people working on even the most common tasks.

Third, the fixed position of keyboards inhibits mobility. A keyboard is typically located at a fixed position, such as a desktop or keyboard tray. This requires that the user come to the keyboard and remain there. The user is unable to access a keyboard while engaging in other tasks, such as walking around a warehouse, moving among patient examination rooms, pacing while brainstorming, etc.

Fourth, productivity and ease of use is reduced because a hand must move from the normal keyboard rest position to manipulate the cursor pointing device (typically a mouse, track ball or pointing stick, such as IBM's TrackPoint® pointing device). Gross motor movements are almost always required to switch between keyboard input tasks and pointing device tasks. Thus, seamless, quick interaction with the computer is not possible, which reduces productivity and ease of use. While such movements may seem beneficial for relieving muscle strain, this is not the case for the most problematic areas. That is, these movements may relieve muscle stress in the shoulders and back, but they do not reduce problematic wrist and hand strain because pointing devices typically require the same wrist and hand positions as does the keyboard.

Fifth, keyboards and the computers containing them must be sufficiently large for touch typing and ease of use. The size and dexterity of human fingers, combined with the large number of keys on a traditional keyboard, establish a lower limit on the size of keyboards and, hence, the devices that possess them (such as laptop computers). Any technology that enables smaller, easy-to-use devices is highly desirable.

There are three main classes of alternative keyboards that address some, but not all of these problems:

1. Split Keyboards: These keyboards attack the first problem (muscle fatigue and RSI) by dividing the keys into left and right hand segments and reshaping the traditional keyboard to improve hand and arm postures. There are three main flavors of split keyboards:

Fixed-Split—The keyboard split and shape is fixed. That is, the angle of the keys, their slope, and their tilt is fixed. Examples include the Microsoft Natural Keyboard and the Cirque Wave Keyboard from Cirque Corporation.

Adjustable-Split—The keyboard split or segmentation is fixed, but certain aspects of the shape, such as the angle, slope, and tilt of each hand's segment, can be adjusted. Examples include the Comfort Keyboard System from Health Care Keyboard Company, Inc. and the MAXIM Adjustable Ergonomic Keyboard from Kinesis Corporation.

Contoured—These keyboards are not flat; their keys are arranged on curved contours that more closely match the reach and movement of the fingers. Examples include the Kinesis Contoured Ergonomic Keyboard from Kinesis Corporation and the Maltron from PCID Maltron Ltd.

2. Vertical Keyboards: These keyboards are similar to split keyboards, except that each segment of keys is tilted until it is vertical. In this "handshake position" the hands and forearms are considered to be in a neutral position. Examples include the Vertical Split-Keyboard from Ergonomic-Interface Keyboard Systems, Inc. and the Ergo-Master from KMC Concepts, Inc.

3. Chording Keyboards: Chording keyboards partially address most of the problems above. Rather than having a single key per character, as most keyboards do, they require a simultaneous combination of keys to be pressed for each character. The advantage is that fewer keys are required, the device containing the keyboard that can be smaller (e.g., see the DataEgg in-hand computer by E2 Solutions), and in some cases, the keyboard position can be highly adjustable and even mobile. Unfortunately, because they do not use the QWERTY key arrangement, they have a very steep learning curve (15 hours training, 80 hours experience minimum, by one estimate) and they are very slow for typing. Touch typing, in the normal sense of the phrase, is not possible with chording keyboards. Examples include the Twiddler from Handykey Corp. and the AccuKey by AccuCorp, Inc.

Naturally, there are exceptions to these main classes such as the DataHand Professional II from DataHand Systems, Inc. This system has a "pod" for each hand. Each pod has a receptacle for each finger that consists of five switches. By moving the fingers against the switches, the functionality of the traditional keyboard is mimicked. As this keyboard has an integrated pointing device, it addresses problems two and four fairly well (new typing skills are required, however). The keyboard is not designed to tilt, so it only partially addresses the first problem and it is not mobile (thus, it does not address the third problem well).

A more complete list of alternative keyboards is provided at http://www.tifaq.org/keyboards.html.

SUMMARY OF THE INVENTION

The invention solves the five problems above by offering the following advantages:

1. The ability to use the keyboard in nearly any position or orientation.

2. The ability to change the position or orientation of the keyboard while in use (to reduce fatigue).

3. The ability to exploit the same gestures required for the operation of traditional keyboards, whether QWERTY or DVORAK.

4. The ability to decouple fine and gross motor movements for ease of use and touch typing ability, while maintaining full keyboard expressibility.

5. The ability to operate the keyboard in a physically and electrically disconnected mode (for mobility).

6. The ability to operate the pointer device in any physical position or orientation and without requiring careful repositioning of the hands to resume typing.

7. The ability to provide full-sized keyboard ease of use, while taking up less space when it is not in use.

The invention is a split keyboard that permits unparalleled range of motion while facilitating touch-typing based on the familiar QWERTY, DVORAK or other layouts. It will typically consist of two 17-key "mini" keyboards, one for each hand. To realize the full expressibility of a 104 key keyboard, the invention senses the wrist position and uses this information to multiply the interpretations of the two sets of 17 keys. As described below, the keyboards may include a pointing device. Furthermore, they may be placed in a static location, such as a desktop, or they may be made free ranging by attaching each to its respective hand using a novel, quick-release mechanism and using an infrared device for communication. Finally, the key arrangement may be contoured or flat and the motion of the key sets may be linear or, more typically, arced.

There are many possible embodiments of the invention, some of which are described below. Each of these embodiments or keyboard solutions is derived in various ways from the following solution elements. Elements one and two are fundamental to all embodiments. Elements three and four are not included in some keyboard embodiments. Each of these elements is believed to be novel for true, non-chording keyboards.

1. Decoupling fine and gross motor movements by: a) restricting the required motions or keystrokes of each finger to a limited number of positions (typically, four or five) that can be reached without moving the hand or employing any other gross motor movement, and b) directly or indirectly sensing the wrist position and multiplying the number of possible interpretations of the keystrokes by the number of discrete wrist angle positions.

2. A means to change the position of the keyboard as the wrist angle is changed such that the keystroke positions are invariant with respect to wrist angle, from the perspective of the fingers.

3. A means to attach the keyboard device to the hand in a manner that does not require grasping and allows easily repeatable keystroke gestures that are invariant with respect to hand or arm position. The primary means described below exploits the observation that the back of each hand, above the middle three metacarpals, moves very little with respect to the fingers. Thus, a very stable brace can be constructed by placing a curved, possibly padded surface across the back of the hand, another surface beneath the palm, a means to create a clamping force between these two surfaces, and providing a way of attaching the keyboard to this brace.

4. A means to access the pointer device and the associated keys (for right and left clicks) without the use of any gross motor movements. Thus, the position of the pointer device will also be invariant with respect to wrist angle.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Lightweight, Unattached, IR Version

This version is the ideal embodiment to describe first because it combines all of the solution elements described above. This description will begin with the overarching concept and then dive into the physical details. It will include a description of how the wrist position and the keystrokes combine to yield the full expressibility of the traditional 104-key keyboard, how the pointer device is used and how the infrared communications are realized. The descriptions of the other embodiments rely on this description and are much shorter.

Figure 1:
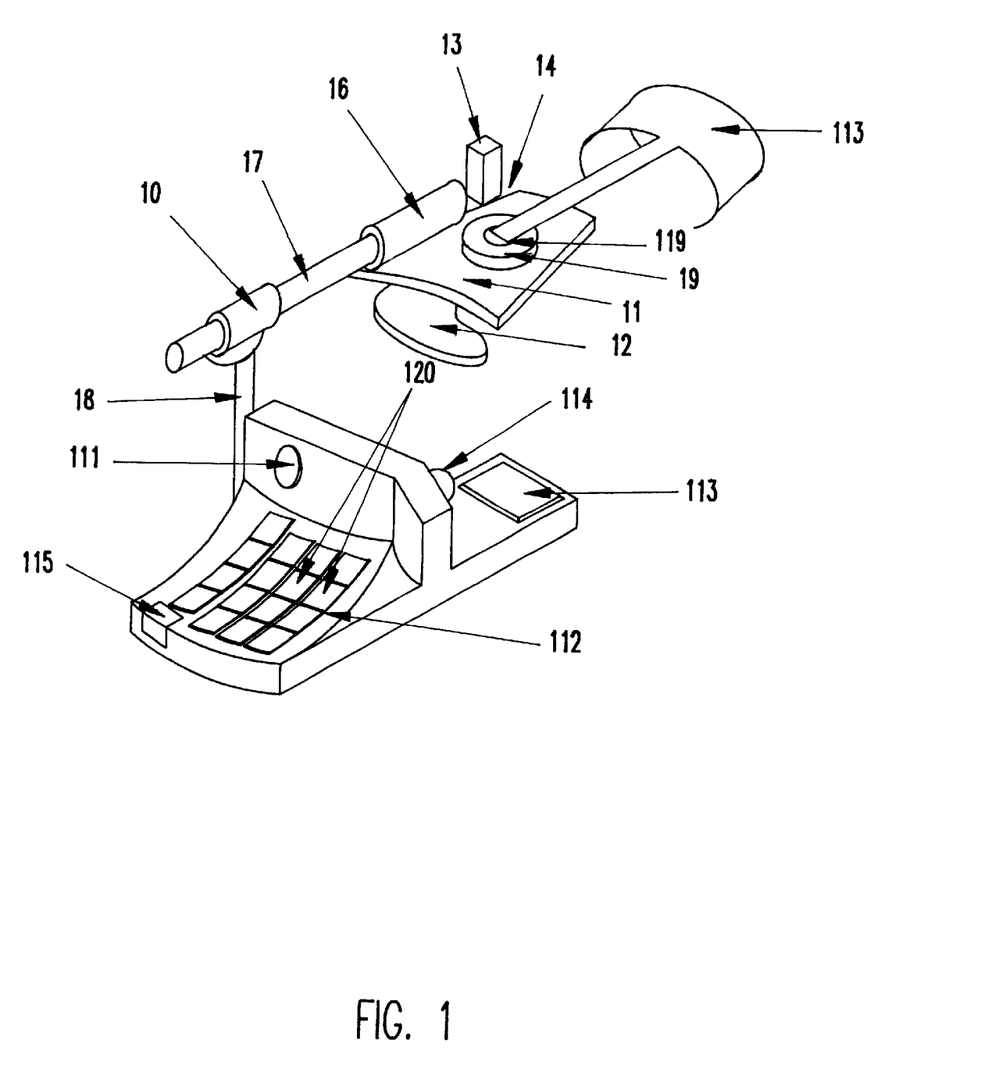
FIG. 1 is an isometric drawing showing a unattached, infrared version of the right hand keyboard component according to one embodiment of the invention.

Referring now to the drawings, and more particularly to FIG. 1, there is shown the right hand component. The left hand component is the exact mirror image of the right hand component. The driving concept behind this version, as depicted in FIG. 1, is that the typist's position should not be constrained by the position of the keyboard. Thus, the typist should be able to twist and stretch his arms, lean back in his chair, or even walk around the room or beyond—all while typing or using the pointing device (in this case, a pointing stick such as IBM's TrackPoint® device). This concept exposes a succession of problems that must be overcome. Let us consider each.

Figure 2:
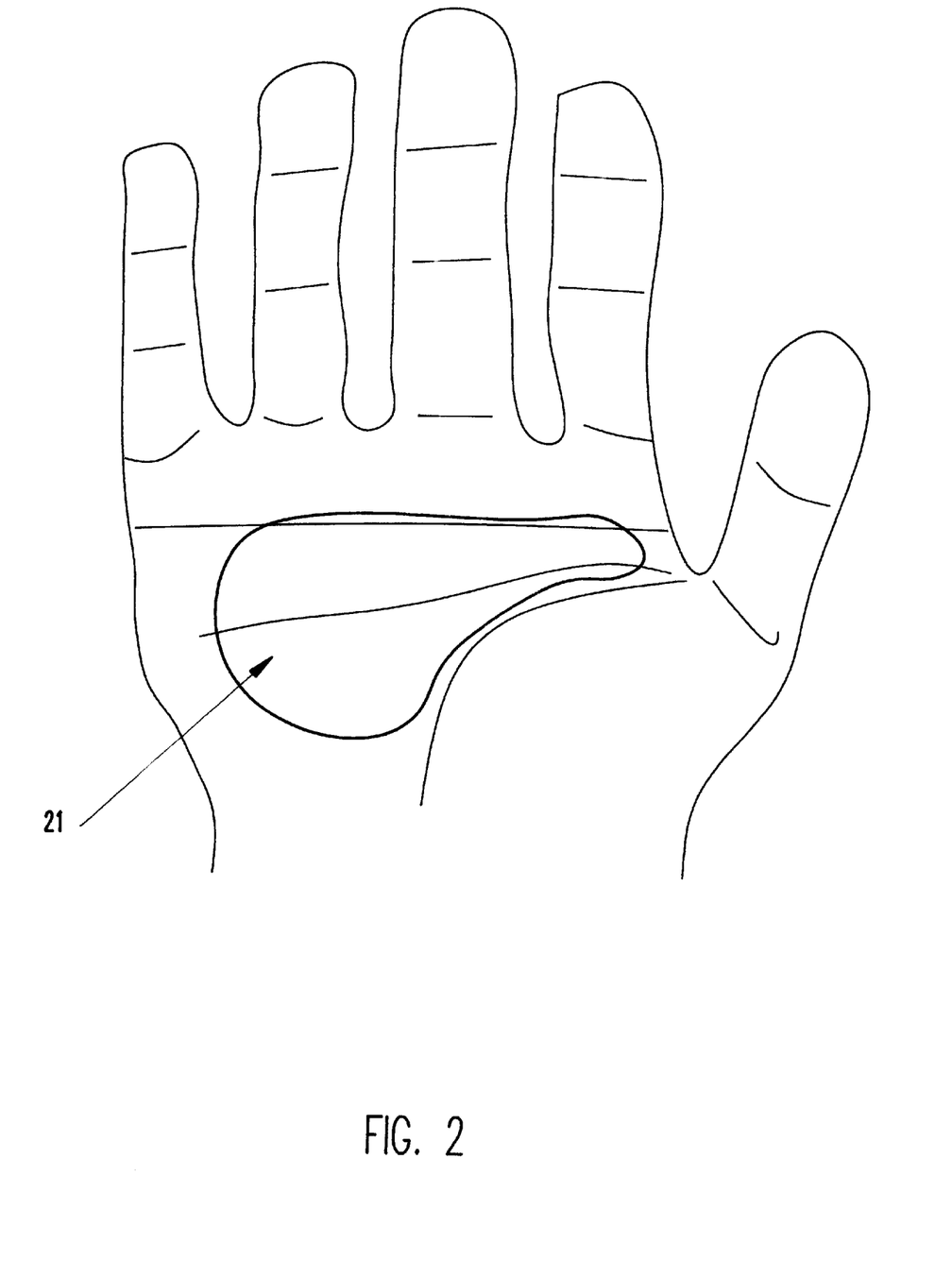
FIG. 2 is a plan view of a human hand, palm side up, showing the shape of the lower brace anvil.

First, to realize such a capability requires attaching the keyboard firmly to the hand without constraining the motion of the fingers and thumb. This is achieved by the Upper Brace 11, the Lower Brace 12, the Lower Brace Descender 13, and the Descender Clamp 14. The Upper Brace 11 is padded and it extends over the middle three metacarpals (the bones extending from the wrist to the knuckles). These three bones define a curved surface that is very stable and that does not move appreciably as the fingers are moved. The Lower Brace 12, coupled by the Lower Brace Descender 13 and the Descender Clamp 14 to the Upper Brace 11, presses against the palm of the hand to keep the overall brace assembly in place. The shape and position of the anvil 21 of the Lower Brace 12 in relation to the palm of the hand is shown in FIG. 2. The anvil 21 may also be padded. This shape and position allow free movement of the fingers and thumb while applying clamping force against the Upper Brace 11.

To apply the brace assembly, the user positions the hand between the upper and lower braces and squeezes them together with the other hand, until the force is firm but not uncomfortable. The ratchet mechanism of the Descender Clamp 14 keeps the two braces in position. To remove the brace assembly, the user releases the ratchet mechanism (the release button is not shown) and slides the assembly off.

Affixing the keyboard securely to the hand creates two additional problems that must be solved. First, it becomes difficult to use the hand for other purposes, like answering the phone or jotting down some notes. Second, it is no longer possible to reach across the keyboard to access the keys beyond the range of the fingers.

Two solutions are provided to the first problem: 1) a quick-release mechanism allows the bracket assembly to be detached from the hand brace assembly, and 2) a spring-loaded flip mechanism allows the keyboard to be swung from the front of the hand to the back. Both of these solutions are implemented with the Dual-Function Bracket Socket 16 shown in FIG. 1. The quick release mechanism relies upon a desk mounted receptacle that is not shown. Many mechanisms are possible for controlling the flip mechanism. The preferred mechanism, at this point, is coupled with the wrist angle position sensor 19 described below.

The second problem of not being able to reach across the keyboard to access additional keys is avoided by limiting the required actions of the fingers to those that they can perform within their own range of motion. Thus, each finger is responsible for striking only four keys in the version shown in FIG. 1 (there could be additional columns of keys for the index and pinky fingers, but this is not preferred). Furthermore, the keyboard and keys 112 are contoured to match the range of motion of the fingers and the thumb is only responsible for striking the space bar 116 and for manipulating the pointing device 114 (e.g., a pointing stick, such as IBM's TrackPoint® device). The keyboard and pointing device mode switch 111 is easily reached by the ring finger.

Figure 1A:
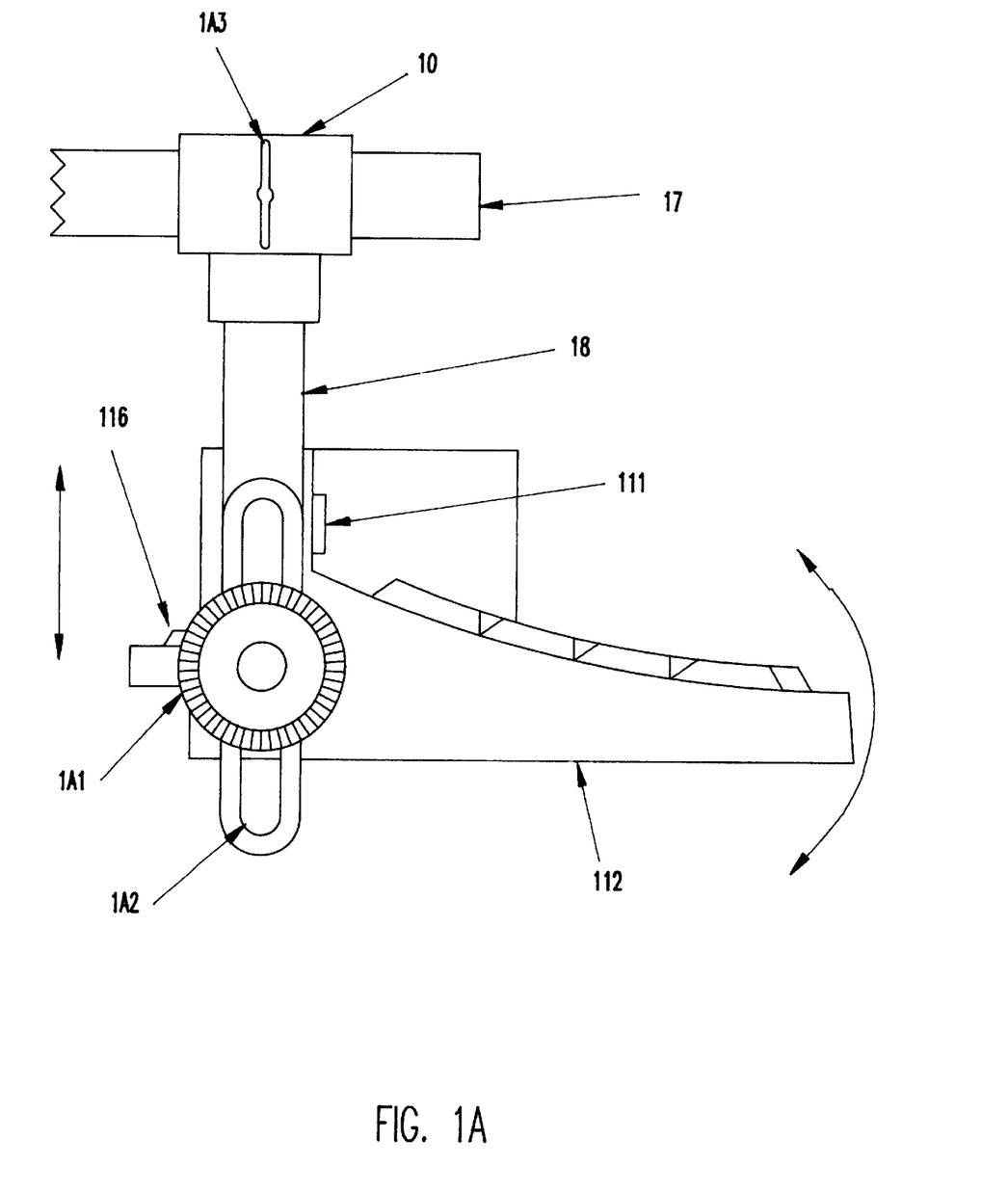
FIG. 1A is the side view of the lower aspect of the bracket assembly.
Figure 1B:
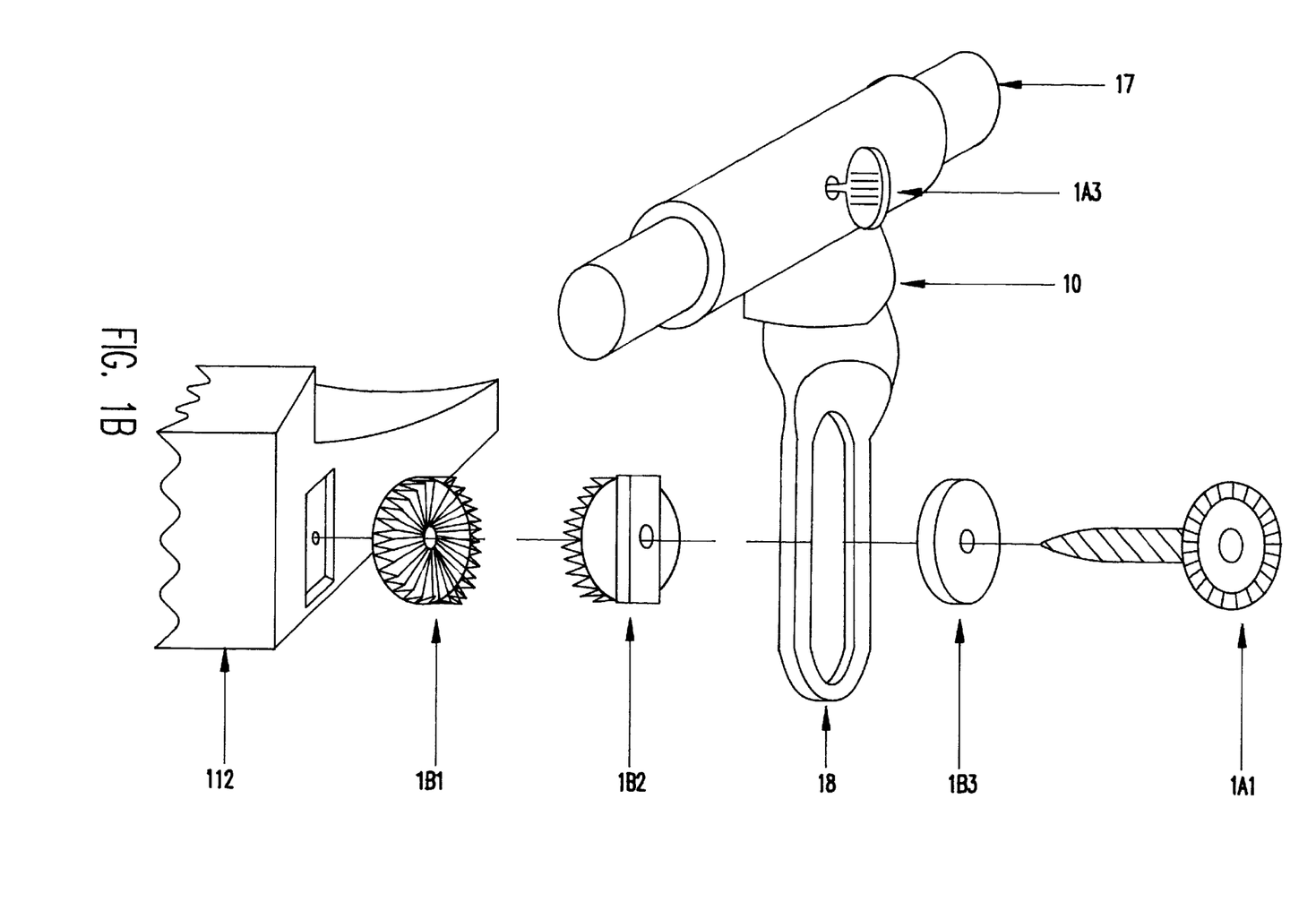
FIG. 1B is a schematic representation of the bracket assembly, illustrating a sequence of connecting the parts.

Finally, the keyboard is attached to the brace assembly 11, 12, 13, 14 with the bracket assembly comprising an Adjustable Extender Yoke 10, a Dual Function Bracket Socket 16, an Adjustable Bracket Extender 17, and an Adjustable Bracket Decender 18, as shown in FIG. 1. The bracket assembly 10, 16, 17, 18 is highly adjustable to allow the relative position of the keyboard to the hand brace 11, 12, 13, 14 to be tailored individually. The following adjustments are possible. First, the angle of the keyboard to the bracket descender can be adjusted by the lower aspect of the bracket assembly 1B1, 1B2, 18, 1B3, 1A (the mechanism is shown in FIG. 1A and FIG. 1B). This figures show the lower aspect of the bracket assembly that is not visible in FIG. 1. The lower aspect of the bracket assembly has a knob 1A1 attached to a screw shaft that fits within the slot 1A2 of the Adjustable Bracket Descender 18. Tightening the knob simultaneously fixes the angle and vertical displacement of the keyboard assembly 112 relative to the brace assembly 11, 12, 13, 14. Finally, the yoke 10 of the bracket extender can slide along the bracket extender. The bracket extender 17, in combination with the yoke 10 and the tightening screw 1A3, fixes the horizontal displacement. The FIG. 1B provides additional details about the lower aspect of the bracket assembly operation. The two serrated disks 1B1, 1B2 can mesh with each other at many angles of rotation. Disks 1B1, 1B2 are keyed to prevent rotation relative to the keyboard assembly 112 the bracket descender 18, respectively. Loosening the knob 1A1 allows these disks to rotate relative to each other. Tightening the knob prevents further rotation and simultaneously presses the outer disk 1B2 and the washer 1B3 against the bracket descender 18 to fix the vertical position. Combined, these mechanisms allow the adjustment of both the position and orientation of the keyboard relative to the hand. It should be noted that this is only one design for the bracket assembly 10, 16, 17, 18. The fundamental principles of this invention are unaffected by the specific bracket design.

As described above, each hand is only able to access 17 different keys, for a total of 34 keys. This is far short of the expressibility of the traditional 104-key keyboard. To solve this problem, an additional input is used—the wrist angle or position. The preferred number of wrist positions is four, one toward the body, one straight ahead, and two away from the body. These are called positions 1, 2, 3, and 4, respectively.

The meanings of the 17 keys are now a function of both the struck key and the wrist position. Thus, the number of wrist positions effectively multiplies the number of effective key meanings. As mentioned above, the wrist angle sensor mechanism may also control the flip mechanism. This would require a fifth. wrist position—an extreme inward position (thus, to quickly flip the keyboard from the front to the back, one would simply jerk the wrist inward). The forearm brace 113 is fixed to the forearm. This enables sensing of the wrist angle position at the wrist angle detector and flip mechanism 19. The hinge 119 allows the wrist to be moved up and down, thus relieving stress, without affecting the measured wrist angle.

The tables below describe a candidate mapping of keystrokes and wrist positions to their interpretations or meanings. The mappings were designed to emulate the gestures normally required to input the information and to facilitate memorization. For example, to input a "6", the user rotates the right hand inward one position and strikes the topmost key with the right index finger. This is very similar to the gestures required on a traditional keyboard. Similarly, to strike the shift key, one rotates either hand outward and strikes the lowermost key with one's pinky finger. In all wrist positions, the thumb's key is considered the space bar 116. Furthermore, the right hand, straight ahead position can be toggled by the "Num Lock" key to represent the middle of the keyboard or the calculator pad. With this scheme, the 34 keys can be used to represent 146 different meanings, which subsumes and even exceeds the capabilities of the traditional 104-key keyboard.

In the following tables, bold faced entries represent characters that are accessible using the same fine and gross motor movements required for traditional QWERTY keyboards. Italic entries represent characters that are accessible using traditional fine motor movements, but different gross motor movements. Non-italic, non-bold faced entries require different fine and gross motor movements Blank cells are presently undefined. The keyboard may also be programmed and labeled to support the DVORAK and other layouts.

TABLE 1

Left Hand, Position 1

| F1 | F5 | F9 | "5" |
|----|----|-----|-----|
| F2 | F6 | F10 | "T" |
| F3 | F7 | F11 | "G" |
| F4 | F8 | F12 | "B" |

TABLE 2

Right Hand, Position 1

| "6" | "Back Space" |
|-----|--------------|
| "Y" | "\" and "/" |
| "H" |              |
| "N" |              |

TABLE 3

Left Hand, Position 2

| "1" | "2" | "3" | "4" |
|-----|-----|-----|-----|
| "Q" | "W" | "E" | "R" |
| "A" | "S" | "D" | "F" |
| "Z" | "X" | "C" | "V" |

TABLE 4

Right Hand, Position 2, "Num Lock" not selected

| "7" | "8" | "9" | "0" |
|-----|-----|-----|-----|
| "U" | "I" | "O" | "P" |
| "J" | "K" | "L" | ":" AND ";" |
| "M" | "<" and "," | ">" and "." | "?" and "/" |

TABLE 5

Right Hand, Position 2, "Num Lock" selected

| "7" | "8" | "9" | "+" |
|-----|-----|-----|-----|
| "4" | "5" | "6" | "+" |
| "1" | "2" | "3" | "Enter" |
| "0" | "0" | "." | "Enter" |

TABLE 6

Left Hand, Position 3

| "~" and "`" | "PrtScrn" and "SysRq" | "Scroll Lock" | "Pause" and "Break" |
|-------------|-----------------------|---------------|---------------------|
| "Tab" | "Insert" | "Home" | "Page Up" |

TABLE 6-continued

Left Hand, Position 3

| "~" and "`" | "PrtScrn" and "SysRq" | "Scroll Lock" | "Pause" and "Break" |
|-------------|-----------------------|---------------|---------------------|
| "Caps Lock" | "Delete" | "End" | "Page Down" |
| "Shift" | "Ctrl" |  | "Windows Logo" | "Alt" |

TABLE 7

Right Hand, Position 3

| "Num Lock" | "/" | "*" | "_" and "-" |
|------------|-----|-----|-------------|
|            |     |     | "{" and "[" |
|            | "Pop Up Menu" |  | """ and "'" |
| "Alt" | "Windows Logo" | "Ctrl" | "Shift" |

TABLE 8

Left Hand, Position 4

| "Esc" |  | "Up Arrow" | "Delete" |
|-------|--|------------|----------|
| "Num Lock" | "Left Arrow" | "Down Arrow" | "Right Arrow" |
| "Ctrl" | "Windows Logo" | "Alt" | "Pop Up Menu" |

TABLE 9

Right Hand, Position 4

| "Home" | "Up Arrow" | "Page Up" | "+" and "=" |
|--------|------------|-----------|-------------|
| "Left Arrow" |  | "Right Arrow" | "}" and "]" |
| "End" | "Down Arrow" | "Page Down" | "Enter" |
| "Insert" | "Insert" | "Delete" | "Shift" |

As mentioned above, the keyboard can also accommodate a pointing device. In the preferred configuration, the pointing device is a pointing stick, such as IBM's TrackPoint® device. The TrackPoint® device 114 "eraser" can be accessed and manipulated simply by moving the thumb. As shown in FIG. 1, there exists a "Keyboard/TrackPoint Mode Switch" 111 that is accessible from the third or ring finger. The purpose of this mode switch is to toggle the interpretations of the keys from character input to mouse click buttons. FIG. 1 shows the preferred keys 120 for the left- and right-click buttons. Other keys may also be used for this purpose. Furthermore, other interpretations may also be used. For example, a key may be selected as the scroll button.

As shown in FIG. 1, this embodiment uses an infrared transceiver 115 to communicate with the computer. It may also be electronically tethered. As there are two devices communicating over this same channel, the communication protocol required is more complex than is normal. There are many candidate protocols for this purpose, however. A carrier sensing, multiple access with collision detection (CSMA/CD) scheme is preferred to reduce the power consumption requirements of the keyboards.

Desktop Version

Figure 3:
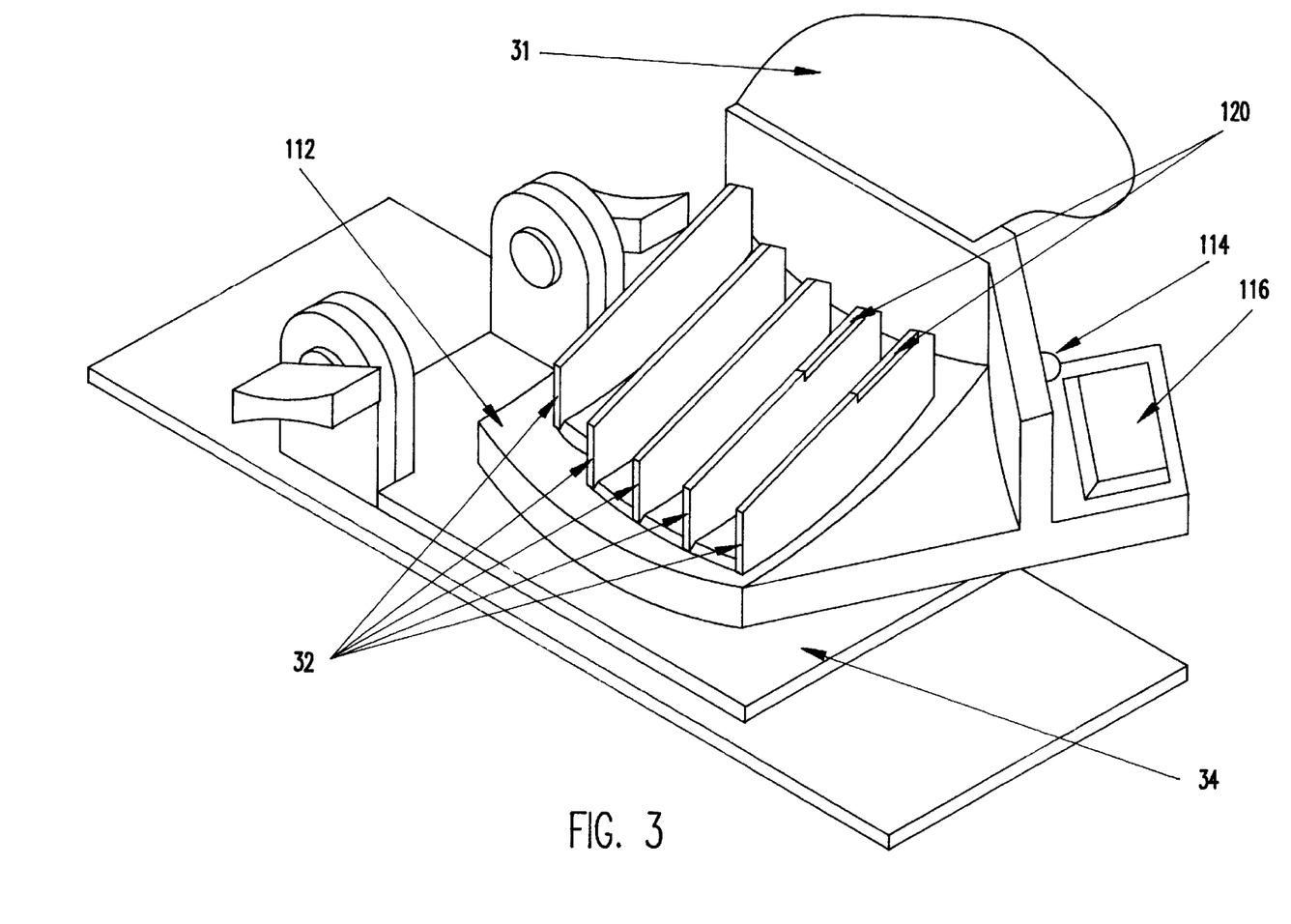
FIG. 3 is an isometric drawing showing an alternative structure for interacting with the mouse buttons and the tilting swivel base with a rotation sensor.

The next version, shown in FIG. 3, is intended to reside on the desktop. Again, only the right hand keyboard is shown. The left hand keyboard is the exact mirror image. The keyboard rotates on its base. The user is required to reach to the keyboard and rest his or her hand on the Adjustable Palm Rest 31. The user's fingers rest between vertical separators or "baffles" 32. As the user's hand rotates, the force of the fingers acting upon the baffles 32 rotates the keyboard. To ensure that the motion is as natural as possible, the center of rotation is behind the palm rest, directly below the wrist. The base may be spring loaded to return to Position 2, as described in the previous section. Furthermore, there may be mechanical "ticks" to provide tactile, angle of rotation feedback to the typist.

A pointing device 114, such as IBM's TrackPoint® pointing device, is accessible by the thumb, as is the space bar 116. In FIG. 3, an alternative means for interacting with the mouse buttons is offered, though not required. In this version, the right and left mouse-click buttons 120 are mounted on top of two of the baffles. Other variations are possible.

The Adjustable palm rest 31 can be adjusted in height and angle. When properly adjusted, the user should be able to reach all the keys without moving his or her hand. A very important feature of this version is the tilting swivel base 34 with a rotation sensor and swivel mechanism 35 shown on FIG. 3 and 3A. As noted above, the center of rotation is directly below the wrist when the base is not tilted (as depicted in FIG. 3). The rotation sensor detects the wrist position for the keystroke mapping function described above. The tilting capability is especially important for ergonomic keyboard applications. One is able rotate the base away from the body and lock it at any angle from flat to vertical. The tension in the loading spring can be adjusted to provide neutral force in Position 2.

Figures 3A, 3B:
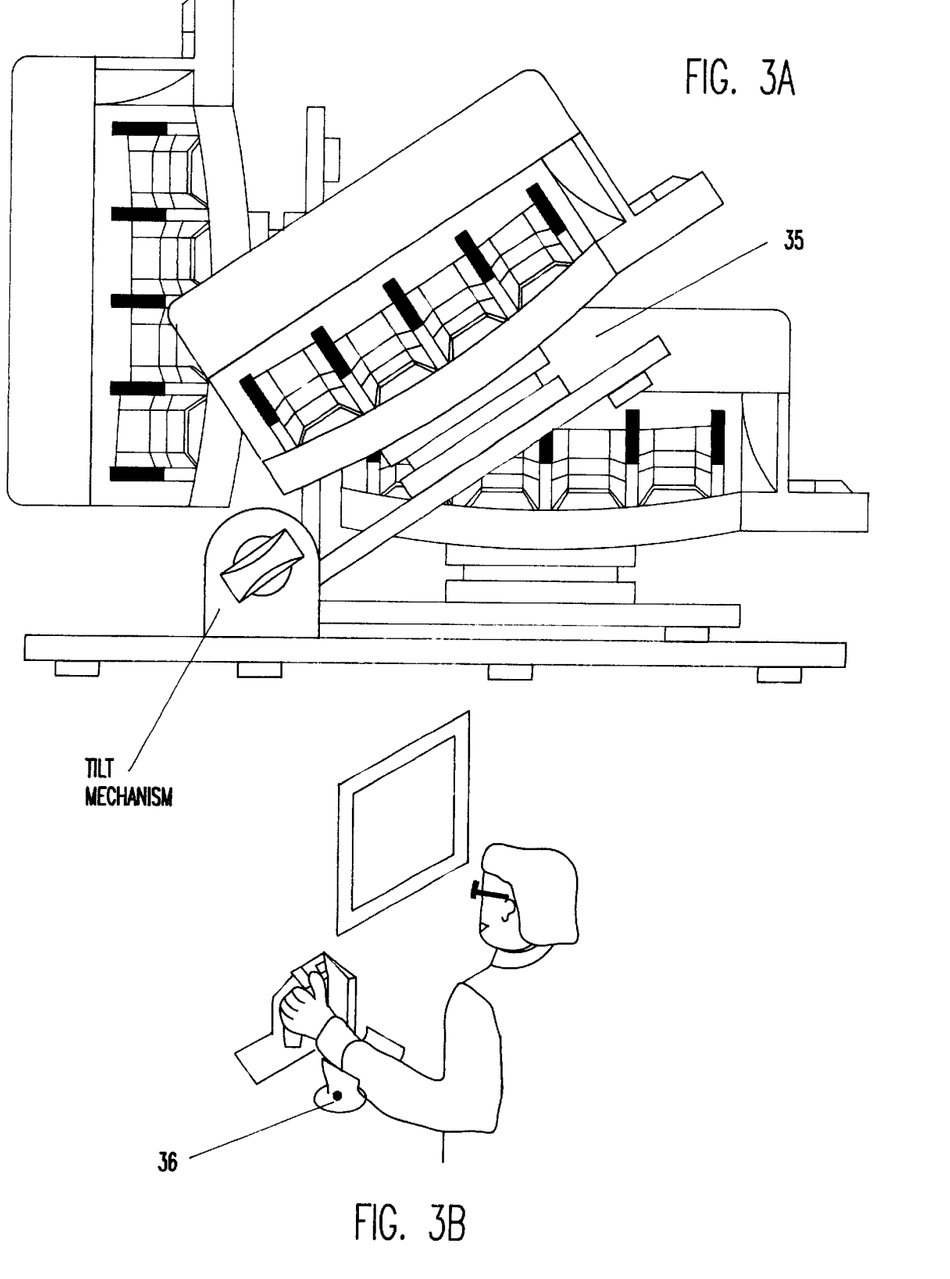
FIG. 3A is a dynamic view of the rotation the titled keyboard about the swivel mechanism.
FIG. 3B is a view of the tilted keyboard with a wrist or arm support while in use.

Finally, the keyboard may be tethered or cabled to the computer as in the embodiment shown in FIG. 3 or it may use an infrared transceiver 115, as in the first embodiment. FIG. 3B shows how the tilted keyboard is used with a wrist and arm support 36.

Belt-mounted, Unattached Version

Figure 4:
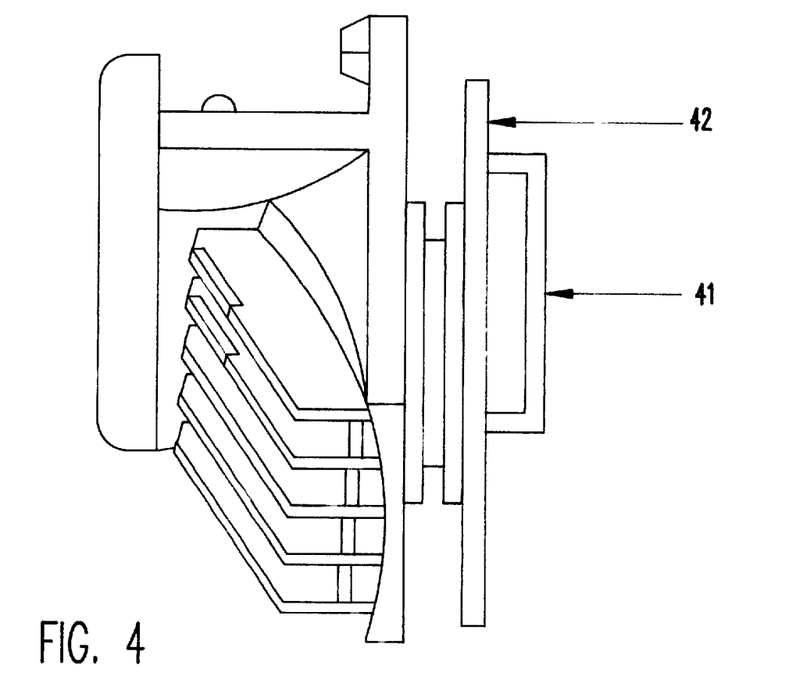
FIG. 4 is a side view of a belt-mounted right hand keyboard.
Figure 4A:
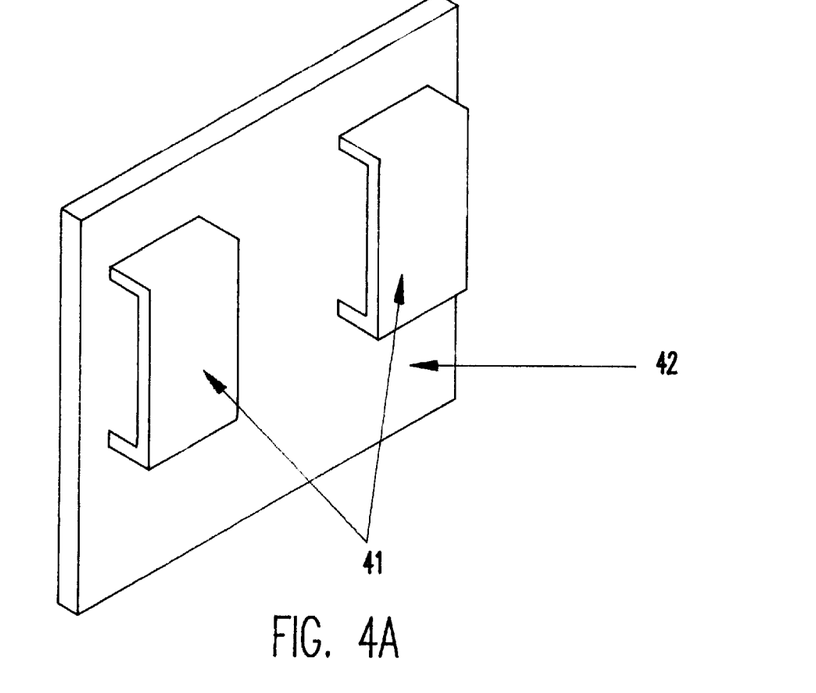
FIG. 4A is a back view of a swivel belt mount.
Figure 5:
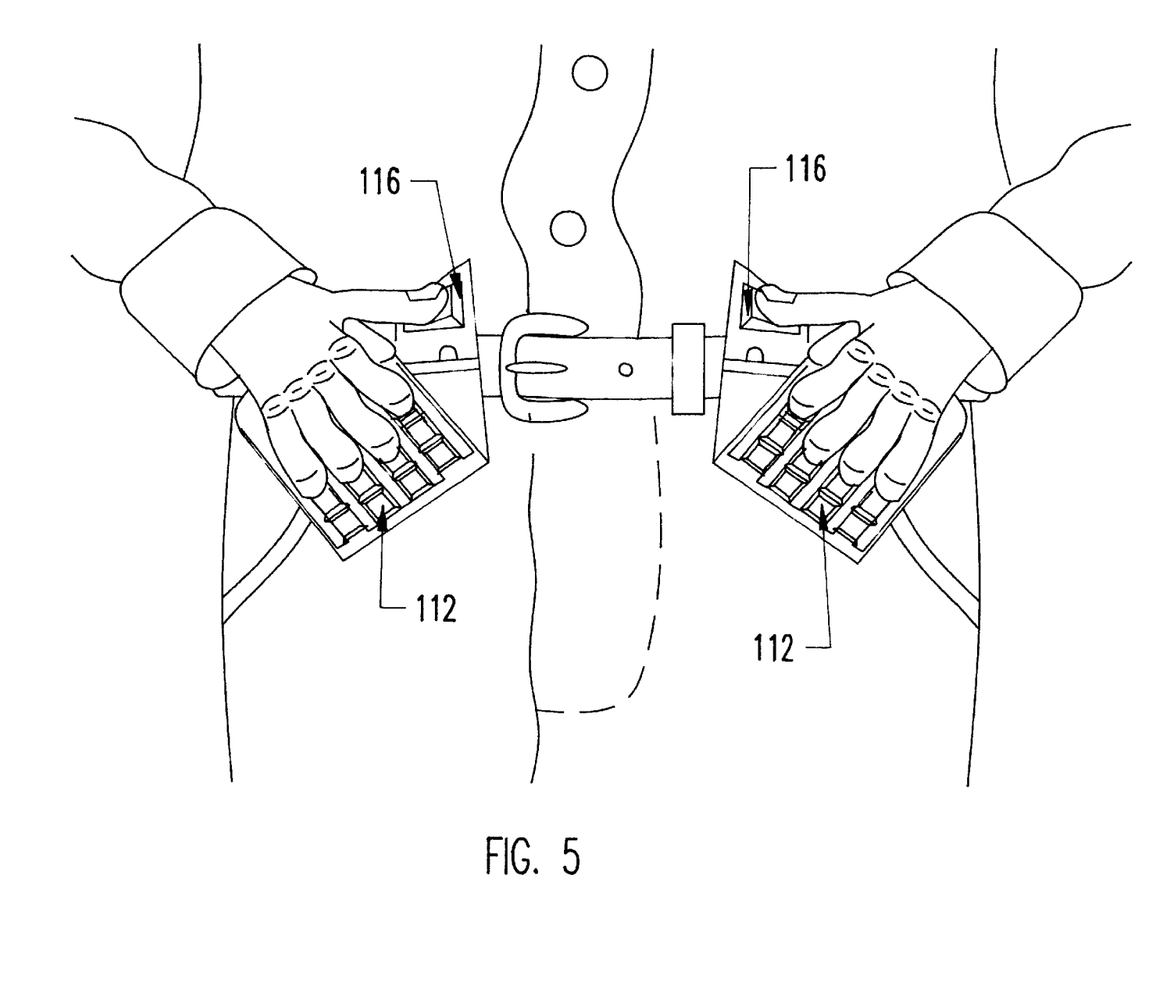
FIG. 5 is a view of belt mounted keyboard while in use.

This embodiment is the same as the second embodiment, except that rather than being desktop mounted, it is actually mounted on the user's belt, as shown in FIGS. 4, 4A and 5. In this version, the back side of the tilting swivel-base mount 42 has belt hooks 41. The right and left hand keyboards may be individually mounted on the user's sides at an angle which is natural for the user, similar in position to pants pocket openings. In this configuration, the user has complete use of his or her hands at all times. Furthermore, the user is able to reach down at any time and type information. This would be especially useful for wearable computer configurations.

Flat Laptop Version with Arced Motion

Figure 6:
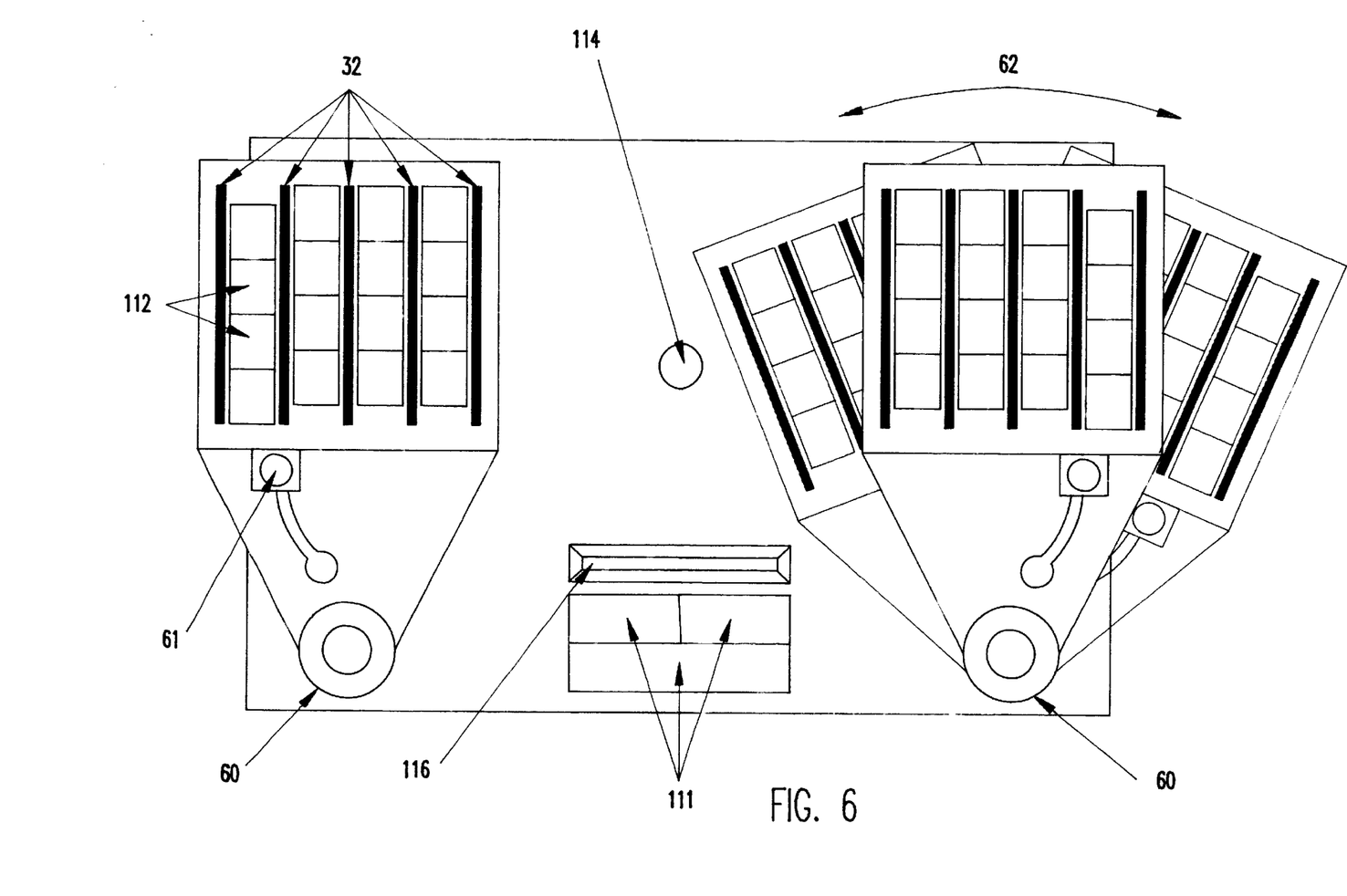
FIG. 6 is a plan view of a flat, laptop version of the invention with an arched motion of the "mini" keyboards in position for use.
Figure 7A:
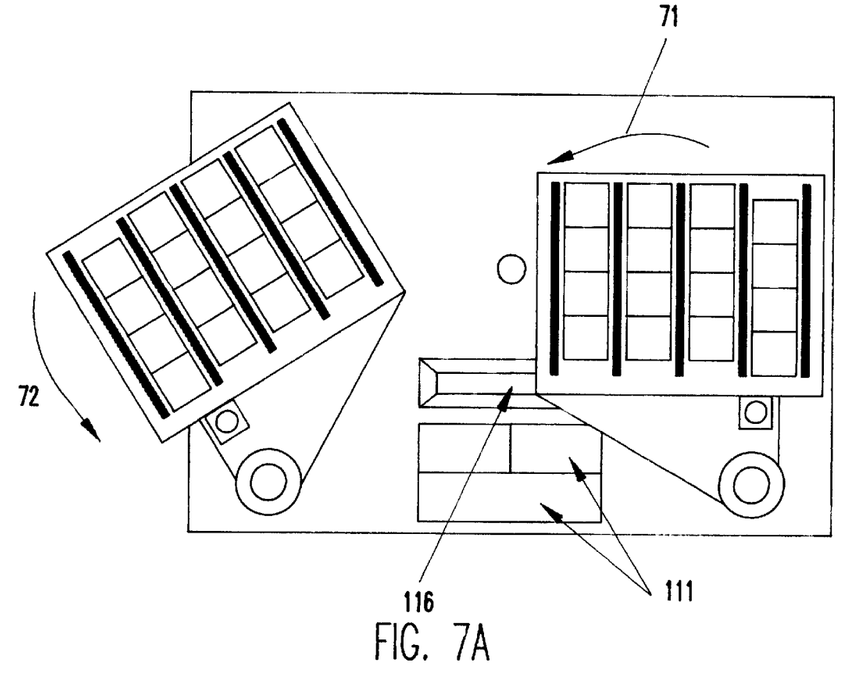
FIG. 7A is a plan view of the flat, laptop version of the invention with keyboard assembly collapsing to smaller size.
Figure 7B:
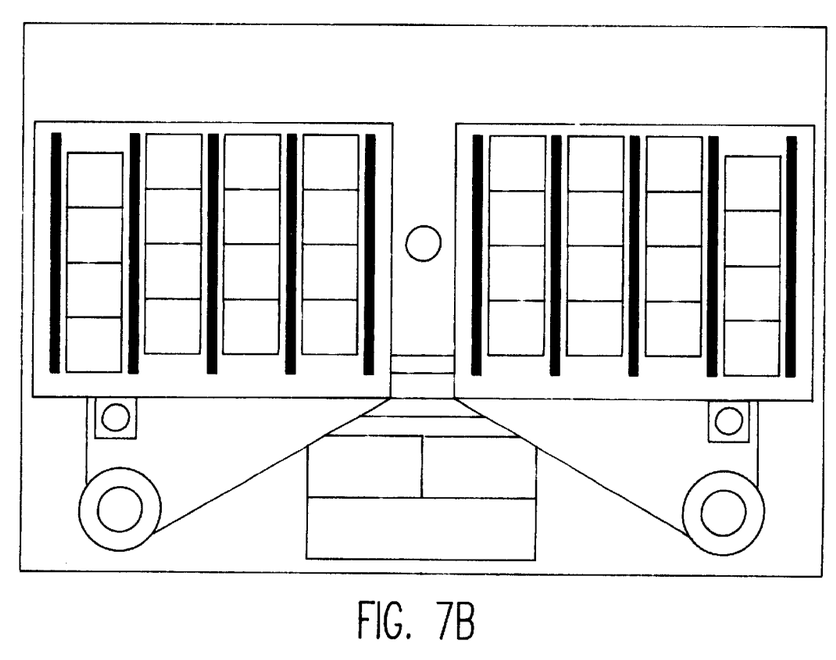
FIG. 7B shows the keyboard assembly fully collapsed.

This embodiment, shown in FIGS. 6, 7A and 7B, is intended to compete with traditional laptop keyboards. Its advantages are that it provides full-sized keys and full range of motion, but it stows in a space that is 8 to 9 keys wide.

As shown in FIG. 6, the contoured keyboard has-been abandoned in favor of a more conventional flat keyboard configuration. The keyboards are mounted on a rotating pivots 60 to allow rotation 62 about the pivots. Due to the configuration, full sized keys 112 can be used. Columns of keys are separated by baffles 32 which, like the embodiment shown in FIG. 3, are used for rotation control. A single space bar 116 is used and a pointing stick 114, such as IBM's TrackPoint® device, with the typical mouse key configuration buttons 111 are provided. The Latch Button 61 allows the keyboard mount to fold into a very small space, as shown in FIGS. 7A and 7B. A process of folding the keyboard consists of two steps: first, each keyboard assembly is collapsed to smaller size 72, and second, each collapsed keyboard assembly is rotated inwardly 71. As the keyboard assembly rotates inwardly, it moves over and depresses the space bar 116 and the mouse buttons 111.

Figure 8:
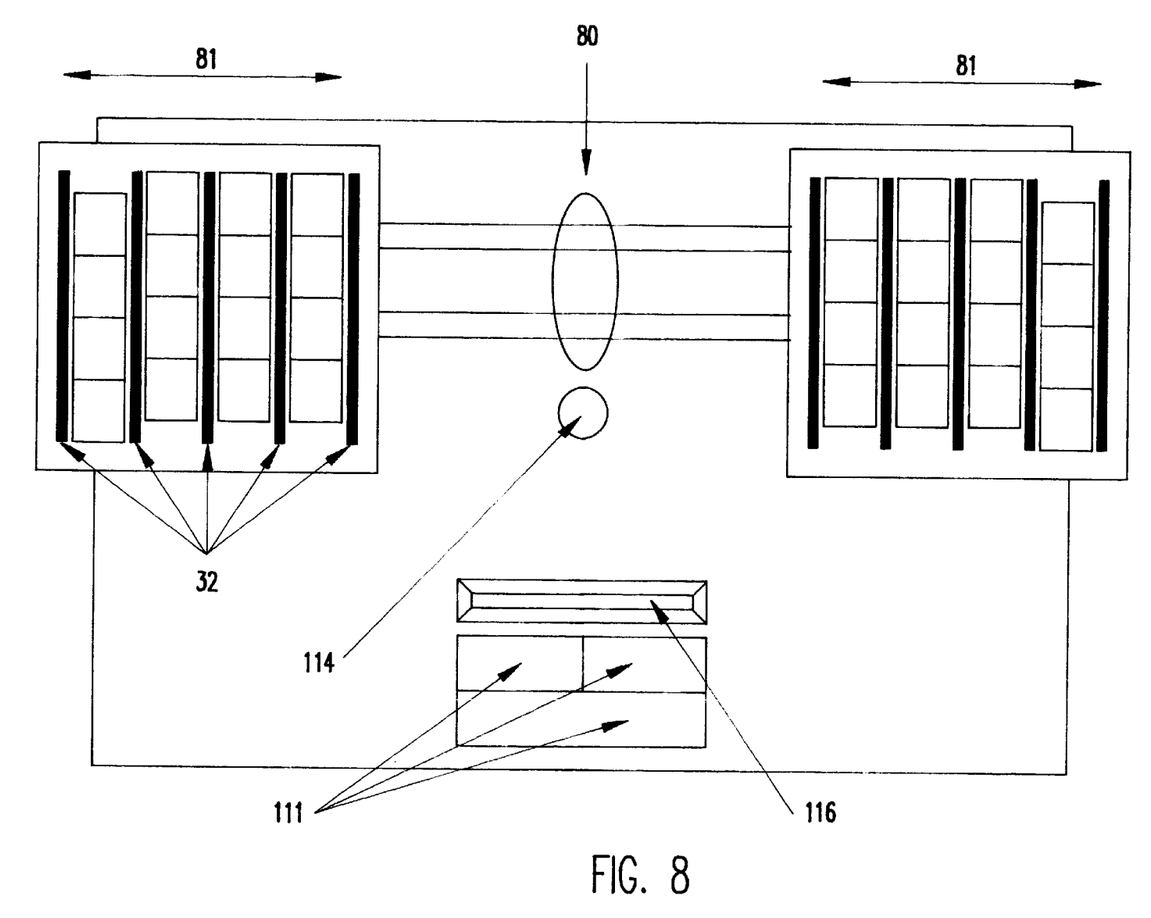
FIG. 8 is a plan view of an alternative version of the invention with a linear motion of the "mini" keyboards.

An alternative embodiment for laptop applications is shown in FIG. 8. This embodiment shows a way to emulate the traditional keyboard even more closely. As such, it inherits most of the primary disadvantages as well. Rather than mounting the keyboards to rotate 62, as in the embodiment shown in FIGS. 6, 7A and 7B, these keyboards slide linearly 81 relative to each other on a track 80. The advantages include full sized keys, full range of motion, small storage space requirements, and potentially cheaper manufacturing costs. Its disadvantages include requiring the user to reach and requiring motions that are not consistent with the user's keystroke gestures.

While the invention has been described in terms of preferred embodiments, those skilled in the art will recognize that the invention can be practiced with modification within the spirit and scope of the appended claims.

I claim:

1. A split keyboard capable of sensing hand displacement of a portion of said split keyboard relative to a reference location to produce first information and one or more keystrokes of a hand on a respective split keyboard portion to produce second information to produce an interpretation of a user input based upon all sensed information whereby sensed displacement multiplies interpretations of respective keys.

2. The split keyboard as recited in claim 1, wherein the keyboard includes means to couple the displacement of the keyboard to the displacement of the user's hand.

3. A gesture sensing split keyboard made up of two sections of keys, one for each hand of an operator, comprising:

a right half divided keyboard section capable of sensing displacement of said right half divided keyboard section by the right hand of an operator relative to a reference location during use, the right half divided keyboard section having a plurality of keys, individual groups of said keys being accessible by individual ones of the fingers of the operator's right hand;

a left half divided keyboard section capable of sensing displacement of said left half divided keyboard section by the left hand of an operator relative to a reference location during use, the left half divided keyboard section having a plurality of keys, individual groups of said keys being accessible by individual ones of the fingers of. the operator's left hand; and means for producing information based on sensed displacements of the operator's hands and respective divided keyboard sections and depression of one or more keys whereby sensed displacement multiplies interpretations of respective keys.

4. The gesture sensing keyboard as recited in claim 3, further comprising:

a wrist angle detector mechanism for the right half divided keyboard section capable of detecting a plurality of wrist positions, each of said detected wrist positions in combination with a different key of the right half divided keyboard section identifying a different character; and a wrist angle detector mechanism for the left half divided keyboard section capable of detecting a plurality of wrist positions, each of said detected wrist positions in combination with a different key of the left half divided keyboard section identifying a different character, whereby the number of characters which can be input is the product of the number of keys of each of said right and left half divided keyboards times a number of detectable wrist positions.

5. The gesture sensing keyboard as recited in claim 3, wherein at least one of said right and left half divided keyboard sections includes a pointing device and one or more selection buttons.

6. The gesture sensing keyboard as recited in claim 5, wherein the pointing device is accessible by the operator's thumb and the selection button is accessible by the operator's index and middle fingers.

7. The gesture sensing keyboard as recited in claim 3, wherein each of said right and left hand divided keyboard sections includes a space bar accessible by the operator's thumb.

8. The gesture sensing split keyboard as recited in claim 3, further including a wireless communication device in each of said right and left half divided keyboard sections to communicate with the computer.

9. The gesture sensing keyboard as in claim 3, further including left and right hand brace assemblies each including a quick-release mechanism for each of said right and left half divided keyboard sections to allow the corresponding bracket assembly to be detached from the corresponding hand brace assembly.

10. The gesture sensing keyboard as in claim 3, further including a spring-loaded flip mechanism for each of said right and left half divided keyboard sections to allow the corresponding keyboard to be swung from the front of the hand to the back.

11. The gesture sensing split keyboard as recited in claim 3 wherein said means for producing information produces said information based on combinations of said sensed displacements and said displacements of said one or more keys.

12. A gesture sensing split keyboard having two sections for generating information, comprising:
 a right hand half divided keyboard section on a swivel base, the right hand half divided keyboard capable of sensing displacement of an operator's right hand together with said right hand divided keyboard relative to said swivel base and having a plurality of keys, individual groups of said keys being accessible by individual ones of the fingers of the operator's right hand;
 a left hand half divided keyboard section on a swivel base, the left hand half divided keyboard capable of sensing displacement of the operator's left hand together with said right hand divided keyboard relative to said swivel base and having a plurality of keys, individual groups of said keys being accessible by individual ones of the fingers of an operator's left hand;
 means for producing information based on respective sensed displacements of the operator's hands together with respective portions of said divided keyboard and depression of one or more keys whereby sensed rotation multiplies interpretations of respective keys.

13. The gesture sensing keyboard recited in claim 12, further comprising:
 vertical separators between said individual groups of keys for the operator's right hand fingers used to transmit a force from the right hand fingers to rotate the right hand rotating tilting swivel base;
 a rotation sensor for the right hand half divided keyboard section for detecting a plurality of wrist positions, each of said detected wrist positions in combination with a different key of the right hand half divided keyboard section identifying a different character and having a possibility of cross keyboard character specification;
 vertical separators between said individual groups of keys for the operator's left hand fingers used to transmit a force from the left hand fingers to rotate the left hand rotating tilting swivel base; and
 a rotation sensor for the left hand half divided keyboard section for detecting a plurality of wrist positions, each of said detected wrist positions in combination with a different key of the left hand half divided keyboard section identifying a different character and having a possibility of cross keyboard character specification.

14. The gesture sensing split keyboard as recited in claim 13, further comprising:
 an adjustable in height and angle right palm rest which is adjustable in such way that the operator can reach all the keys without moving right hand; and
 an adjustable in height and angle left palm rest which is adjusted in such way the operator can reach all the keys without moving left hand.

15. The gesture sensing keyboard as recited in claim 12, wherein at least one of said right and left half divided keyboard sections includes a pointing device and a selection button.

16. The gesture sensing keyboard as recited in claim 15, wherein the pointing device is accessible by the operator's thumb and the selection buttons are accessible by the operator's index and middle fingers.

17. The gesture sensing keyboard as recited in claim 16, further comprising vertical separators between said individual groups of keys and wherein the selection button is mounted on top of a vertical separator.

18. The gesture sensing keyboard as recited in claim 12, wherein each of said right and left hand divided keyboard sections includes a space bar accessible by the operator's thumb.

19. The gesture sensing keyboard as recited in claim 12, wherein the rotating tilting swivel bases of said right and hand half divided keyboards are designed to be mounted up on a stable surface during use.

20. The gesture sensing keyboard as recited in claim 12, wherein the rotating tilting swivel bases of said right and left hand half divided keyboards are designed to be mounted on the operator's belt for wearable computer configuration.

21. The gesture sensing keyboard as recited in claim 12, further including a wireless communication device in each of the right and left hand divided keyboards to communicate with the computer.

22. The gesture sensing split keyboard as recited in claim 12 wherein said means for producing information produces said information based on combinations of said sensed displacements and said displacements of said one or more keys.

23. A gesture sensing split keyboard for inputting information to a portable computing or communication device, comprising:
 a right hand half divided keyboard section attached to and moveable with respect to said laptop computer, the right hand half divided keyboard section capable of sensing displacement of an operator's right hand together with said right hand divided keyboard section relative to said portable computing or communication device and having a plurality of keys, individual groups of said keys being accessible by individual ones of the fingers of an operator's right hand;

a left hand half divided keyboard section attached to and moveable with respect to said laptop computer, the left hand half divided keyboard section capable of sensing displacement of the operator's left hand together with said left hand divided keyboard section relative to said portable computing or communication device and having a plurality of keys, individual groups of said keys being accessible by individual ones of the fingers of an operator's left hand; and means for producing information based on sensed displacements of the operator's hands together with a respective divided keyboard section and depression of one or more keys whereby sensed rotation multiplies interpretations of respective keys.

24. The gesture sensing keyboard recited in claim 23, further comprising:

vertical separators between said individual groups of keys for the operator's right hand fingers used to transmit a force from the right hand fingers to move the right hand half divided keyboard with respect to said laptop computer;

a motion sensor for the right hand half divided keyboard for detecting a plurality of positions of the right hand half divided keyboard, each of said detected positions in combination with a different key of the right hand half divided keyboard identifying a different character and having a possibility of cross keyboard character specification;

vertical separators between said individual groups of keys for the operator's left hand fingers used to transmit a force from the left hand fingers to move the left hand half divided keyboard with respect to said laptop computer; and a motion sensor for the left hand half divided keyboard for detecting a plurality of positions of the left hand half divided keyboard, each of said detected positions in combination with a different key of the left hand half divided keyboard identifying a different character and having a possibility of cross keyboard character specification.

25. The gesture sensing split keyboard as recited in claim 23, wherein the right and left hand half divided keyboards are pivoted on said portable computing or communication device to rotate about pivot points.

26. The gesture sensing split keyboard as recited in claim 23, further including latching mechanisms for each of the right and left hand half divided keyboards to stow the keyboards in a stored position when not in use.

27. The gesture sensing split keyboard as recited in claim 23, wherein the right and left hand half divided keyboards are mounted on a track to slide linearly along said track.

28. The gesture sensing split keyboard as recited in claim 23, further comprising a space bar mounted on a surface of the portable computing or communication device and accessible by the operator's right or left thumb.

29. The gesture sensing split keyboard as recited in claim 28, further comprising a cursor pointing device mounted on said surface of the portable computing or communication device and accessible by the operator's right or left index finger.

30. The gesture sensing split keyboard as recited in claim 29, further comprising at least one selector button mounted on said surface of the portable computing or communication device and accessible by the operator's right or left thumb.

31. The gesture sensing split keyboard as recited in claim 23 wherein said means for producing information produces said information based on combinations of said sensed displacements and said displacements of said one or more keys.

* * * * *